United States Patent
Powell et al.

(10) Patent No.: US 6,479,021 B2
(45) Date of Patent: Nov. 12, 2002

(54) ADVANCED VITRIFICATION SYSTEM PYROGRAPHITE

(76) Inventors: James R. Powell, 9 Soundview Dr., Shoreham, NY (US) 11786; Morris Reich, 72-78 139th St., Kew Gardens Hills, NY (US) 11367

( * ) Notice: Subject to any disclaimer, the term of this patent is extended or adjusted under 35 U.S.C. 154(b) by 0 days.

(21) Appl. No.: 09/733,526

(22) Filed: Dec. 11, 2000

(65) Prior Publication Data

US 2001/0000525 A1 Apr. 26, 2001

Related U.S. Application Data

(62) Division of application No. 09/350,194, filed on Jul. 9, 1999, now Pat. No. 6,211,424
(60) Provisional application No. 60/094,593, filed on Jul. 30, 1998.

(51) Int. Cl.[7] ............... B32B 27/04; B32B 5/02; B01J 19/12; G21F 9/00
(52) U.S. Cl. ............ 422/159; 422/159; 422/186.04; 588/1; 588/2; 588/10; 588/11; 588/16; 588/20
(58) Field of Search ............ 422/159, 237–241, 422/908; 588/11; 356/244

(56) References Cited

U.S. PATENT DOCUMENTS 4,389,459 A * 6/1983 Mirra et al. ............... 428/457
4,446,563 A * 5/1984 Willay ....................... 422/908
4,708,478 A * 11/1987 Andrews et al. ............ 356/244
4,812,212 A * 3/1989 Dimond et al. ............. 204/147
5,126,112 A * 6/1992 Burgie ....................... 422/241
5,678,237 A * 10/1997 Powell et al. ................ 588/11

OTHER PUBLICATIONS http://www.ichtj.waw.pl/ichtj/market/m-eng/dep_01/graph.htm.*

* cited by examiner

Primary Examiner—Marian C. Knode
Assistant Examiner—Douglas W. Rudnick

(57) ABSTRACT

A device for improving waste vitrification in a disposable canister, the process for using the device, and the process for making the device. The disposable canister, also known as a module, has outer and inner containers with thermal insulation therebetween. The device includes an inner container of graphite having a layer of pyrographite on its external wall. The outer container is typically made of stainless steel. The inner container is heated, typically by induction, to melt the frit and waste. The melted mixture is then cooled to form a vitrified product in the module. The fabrication of the pyrographite coating on the inner container involves heating the container to about 1500 degrees centigrade in a methane atmosphere, then cooling the container to ambient temperature.

9 Claims, 1 Drawing Sheet

ADVANCED VITRIFICATION SYSTEM PYROGRAPHITE

This application is a divisional of Ser. No. 09/350,194 filed Jul. 9, 1999 now U.S. Pat. No. 6211,424 issued on Apr. 3, 2001, which in turn claims the benefit of U.S. Provisional Application No. 60/094,593 filed on Jul. 30, 1998.

BACKGROUND OF THE INVENTION

The present invention relates generally to hazardous wastes, and, more specifically, to vitrification thereof for long term storage.

The disclosure of U.S. Pat. No. 5,678,237, which provides a method of in-situ vitrification of waste materials in a disposable canister, is hereby incorporated herein by reference. The disposable canister is a module comprising an inner container, an outer container, and insulation therebetween. The outer container serves as the traditional disposal container typically made of steel, which is thermally insulated from an inner container, typically of made of graphite. The inner container serves as a crucible to melt a waste/frit mixture and contain a molten vitrified product. The inner container is typically made of graphite and is typically heated by induction.

The invention, which is the subject of this application, is a means and a method to maximize the delivery of inductive energy to the inner graphite container, minimize heating of the outer container, minimize the thickness of the inner container, and because of the minimization in thickness of the inner container, correspondingly increase the volume inside the canister which is available for waste. The invention relates to the use of a pyrographite layer on the exterior wall of the inner container.

Accordingly, it is desired to provide an Advanced Vitrification System Pyrographite (AVSP) to practice an improved method for modularly processing and vitrifying waste materials, such as nuclear waste, in a disposable canister. A combination, method of using and method of making a pyrographite layer on the exterior wall of the inner container is the innovation sought to be protected.

BRIEF SUMMARY OF THE INVENTION

A device for improving waste vitrification in a disposable canister, the process for using the device, and the process for making the device. The disposable canister, also known as a module, is composed of outer and inner containers with thermal insulation therebetween. The device includes an inner container, typically made of graphite, having a layer of pyrographite on its external wall. The outer container is typically made of stainless steel. The inner container is heated, typically by induction, to melt the frit and waste. The melted mixture is then cooled to form a vitrified product in the module. The fabrication of the pyrographite coating on the inner container involves heating the container to about 1500 degrees centigrade in a methane atmosphere, then cooling the container to ambient temperature.

DETAILED DESCRIPTION OF THE INVENTION

Figure 1:
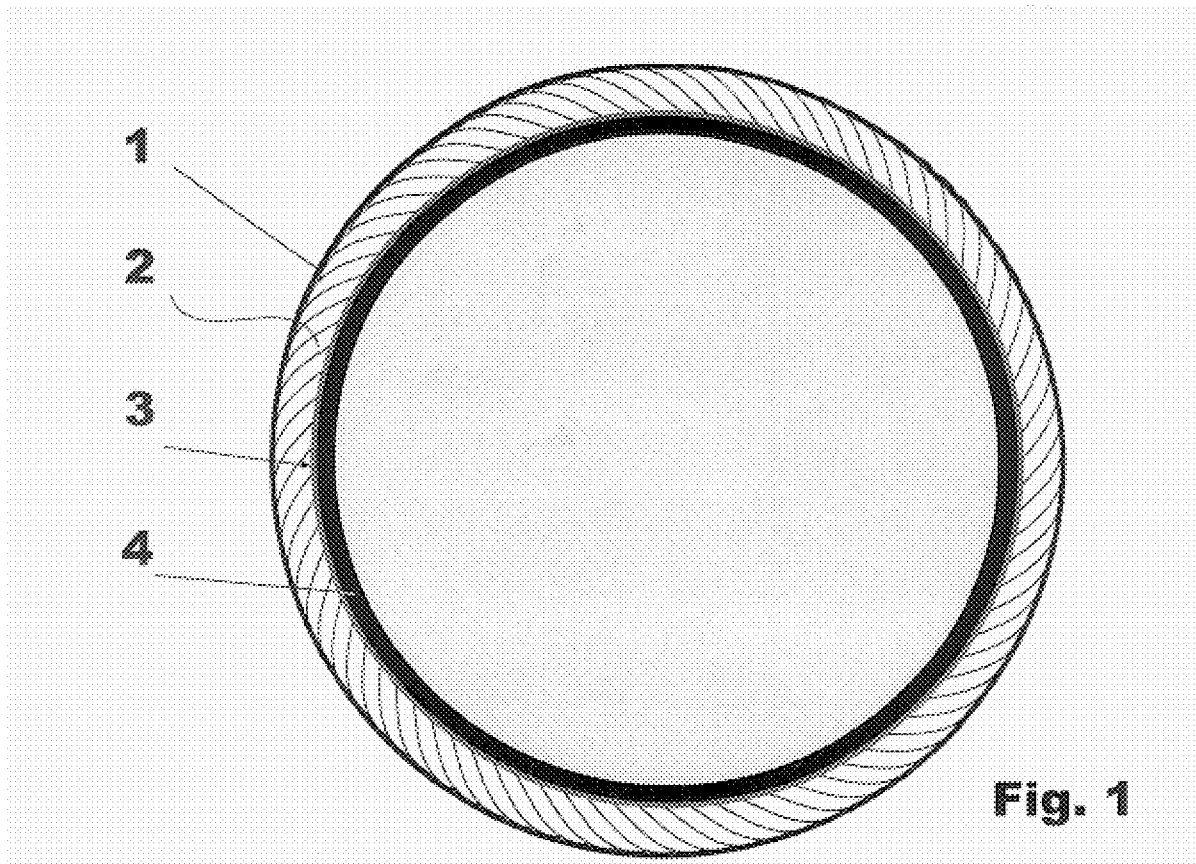
FIG. 1 is the top view of a disposable canister showing the pyrographite layer on the outer wall of the inner container.
Figure 2:
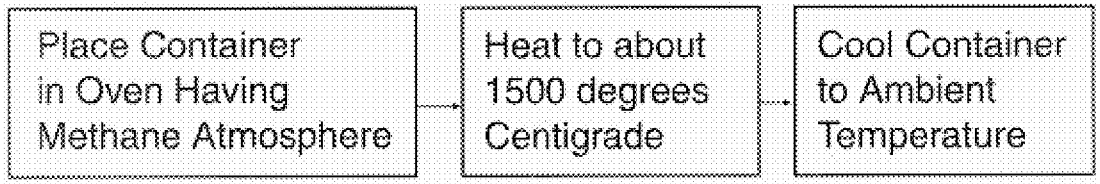
FIG. 2 is the process flowsheet showing the method of making the pyrographite layer.

The AVSP invention significantly improves the apparatus and the methodology for vitrification of wastes within a disposal canister having an inner and an outer container. The AVSP invention also involves the method of making the improvement to the apparatus. In the embodiment of the invention shown in FIG. 1, the outer container (1) is separated from the inner container(4) made of graphite by insulation (2). The inner container has a pyrographite coating (3) on its exterior wall. In the embodiment of the invention shown in FIG. 2, the pyrographite coating is made by placing the container in an oven having a methane atmosphere, then it is heated to about 1500 degrees centigrade, and then allowed to cool to ambient temperature.

In particular, the AVSP invention provides a device, a method of using the device to minimize heating the outer container while heating the inner container, typically through induction, and a method of manufacturing the device. The AVSP invention enhances the protection of the overall integrity of the outer container, which otherwise could be compromised by unwanted heat through induction. The AVSP invention significantly improves the efficiency and functionality of the heating and vitrification process.

The fraction of the electrical input energy that can be used to heat the inner container, typically a graphite crucible, depends, in part, on:

1) the relative thickness of the inner container, typically made of graphite, and the outer container, typically made of stainless steel; and 2) the relative electrical conductivity of the inner container and the outer container.

For purposes of discussion, it is hereinafter assumed that the inner container is made of graphite and the outer container is made of stainless steel. Assuming that the outer stainless steel canister is fully continuous electrically (i.e., there is no non-conducting joint in the stainless steel canister), the ratio of electrical power deposited in the graphite inner container to that deposited in the outer stainless steel container is equal to the ratio of the product of specific electrical resistivity in ohm-centimeters of the steel and the thickness of the graphite inner container in centimeters over the product of the specific electrical resistivity of the graphite and the thickness of the outer stainless steel container in centimeters.

The above relationship is based on the condition that the radial thickness of the thermal insulation layer between the hot graphite and the cool stainless steel is small compared to the radius of the canister.

The electrical resistivity of graphite can be made as low as about 300 micro ohm-cm, while the resistivity of stainless steel is on the order of 100 micro ohm-cm. The radial thickness of the graphite container on the other hand, is approximately 3 times the thickness of the stainless canister.

Accordingly, the ratio of the electrical power deposited in a graphite inner container to that deposited in an outer stainless steel container is approximately equal to the product of 100 times 300 over the product of 300 times 100, or about 1. A ratio of 1 means that about as much electrical heating power is deposited in the stainless steel container as in the graphite inner container.

The ratio of the electrical power deposited in the graphite inner container to that deposited in the outer stainless steel container can be made much greater than 1 using a pyrographite coating on the exterior wall of the inner container.

Pyrographite is a highly anisotropic, two dimensional planar graphite structure produced by the thermal decomposition of methane on a hot surface (e.g., about 500° C.). The deposited pyrographite has very high thermal and electrical resistivity along the plane of deposition, and low conductivity in the transverse direction to the plane. In fact, the in-plane resistivity of pyrographite is almost as low as that of copper.

As an example, if the graphite container were to have a pyrographite layer that was only 5% of the total thickness of the graphite (i.e., 50 mils out of a total thickness of one inch), the resultant overall electrical resistivity of the 2-layer graphite container would be a factor of approximately 10 lower, making the ratio of the electrical power deposited in the graphite inner container to that deposited in the outer stainless steel container about equal to 10/1. In this case, over 90% of the input electrical power would go into he graphite container rather than only one-half.

Increasing the fraction that goes into the graphite container would ease the cooling load on the outer stainless steel canister, and reduce the cost of the electrical energy required for the drying/vitrification process.

Deposition of the pyrographite on the exterior wall of the inner container is a simple process. It could be carried out before or after coating the inside of the crucible with alumina or other ceramic. The fabrication of the pyrographite coating on a graphite container involves heating the container to about 1500 degrees centigrade in a methane atmosphere, then cooling the container to ambient temperature. In addition to maximizing the heating fraction in the graphite crucible, the use of a pyrographite layer would enable the use of a thinner graphite inner container for a given ratio of the electrical power deposited in the inner container to that deposited in the outer container, which helps to maximize the amount of glass filling the available volume inside the inner container.

EXAMPLE

This example illustrates the preferred embodiment of the Advanced Vitrification System Pyrographite used for the concentration and vitrification of high-level radioactive wastes. The canister has an inner container made of graphite having a ceramic coating on the inside and a pyrographite coating on the outside. The inner container serves as a crucible to vitrify the wastes. Insulation is placed between the inner container and the outer container. Frit and high level radioactive waste are added to the inner container. The inner container is then inductively heated to the vitrification temperature. The pyrographite coating on the exterior wall of the inner container lowers the electrical resistivity of the inner container by a factor of about ten.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A disposable module for vitrification of waste comprising:

an outer container, an inner container disposed inside the outer container wherein the inner container has a single coating of pyrographite on its exterior surface such that the electrical resistivity of the inner container is lowered by a factor of approximately 10; and insulation between the outer container and the inner container.

2. A disposable module according to claim 1 wherein the inner container is graphite.

3. A disposable module according to claim 2 in which the pyrographite coating has a thickness of about 5 percent of the thickness of the inner container.

4. A disposable module according to claim 1 in which the pyrographite coating has a thickness of about 5 percent of the thickness of the inner container.

5. A method of vitrifying waste comprising:

loading waste in the disposable module of claim 1;

heating the waste inside the disposable module under conditions to melt the waste; and cooling the melted waste inside the disposable module to produce the vitrified water.

6. The method according to claim 5 wherein the inner container of the disposable module made of graphite.

7. The method according to claim 6 in which the pyrographite coating has a thickness of about 5 percent of the thickness of the inner container.

8. The method according to claim 5 in which the pyrographite coating has a thickness of about 5 percent of the thickness of the inner container.

9. A method of making a the disposable module of claim 1 comprising:

loading an inner container in an oven wherein the oven has a methane atmosphere;

heating the oven to about 1500 degrees Centigrade;

cooling the inner container to ambient temperature.

* * * * *